United States Patent [19]

Repella

[11] 4,450,614

[45] May 29, 1984

[54] METHOD OF MAKING A POLYTETRAFLUOROETHYLENE HYDRODYNAMIC SEAL

[75] Inventor: James A. Repella, Southfield, Mich.

[73] Assignee: Microdot Inc., Darien, Conn.

[21] Appl. No.: 350,359

[22] Filed: Feb. 19, 1982

[51] Int. Cl.[3] .................... B23D 17/00; B21D 39/00; B21D 53/12

[52] U.S. Cl. .................... 29/417; 29/511; 29/148.4 S

[58] Field of Search .................... 277/134; 83/54, 861, 83/862, 879, 880; 29/417, 148.4 S

[56] References Cited

U.S. PATENT DOCUMENTS 3,857,156 12/1974 Clark .................... 29/148.4 S
3,929,341 12/1975 Clark .................... 29/148.4 S
4,118,856 10/1978 Bainard et al. .................... 29/511

*Primary Examiner*—Howard N. Goldberg
*Assistant Examiner*—Steven E. Nichols
*Attorney, Agent, or Firm*—Lyman R. Lyon

[57] ABSTRACT

The disclosure relates to a method of manufacturing an oil seal element from polytetrafluoroethylene and the like. A tubular billet having concentric inner and outer cylindrical surfaces is faced off at one end. An arcuate slit is cut in the end face of the billet at each of a plurality of angularly spaced positions. Indexing of the billet is synchronized with rotation of the slitting tool. A disk of desired thickness having arcuate slits on one of its faces is then sliced from the billet, thereby also facing the billet for the next slitting sequence.

6 Claims, 4 Drawing Figures

METHOD OF MAKING A POLYTETRAFLUOROETHYLENE HYDRODYNAMIC SEAL

BACKGROUND OF THE INVENTION

The invention relates to a method of manufacture of a polytetrafluoroethylene hydrodynamic seal of the type disclosed in my copending application Ser. No. 322,640, filed Nov. 18, 1981, now abandoned, for Bi-Directional Hydrodynamic Seal.

Polytetrafluoroethylene is a material known for its ability to withstand the environmental conditions developed incident to sliding contact of a seal element with a relatively movable element. However, the difficulty of molding polytetrafluoroethylene makes it impractical to use conventional techniques for the manufacture of polytetrafluoroethylene hydrodynamic seals which characteristically have ribs, grooves, or other hydrodynamic structures molded into the. seal element. One method of making a hydrodynamic polytetrafluoroethylene seal is taught in U.S. Pat. No. 3,857,156.

SUMMARY OF THE INVENTION

Practice of the method of the instant invention results in an improved polytetrafluoroethylene seal element that is relatively easily fabricated by simple tooling. A tubular billet of polytetrafluoroethylene having concentric inner and outer cylindrical surfaces is faced off to produce an end face that is flat and perpendicular to the axis of the cylindrical surfaces. The end face is then provided with a plurality of overlapping, arcuate, angularly related slits that intersect the inner cylindrical surface of the billet to define a plurality of circumferentially spaced triangular pads. After machining of the slits, a radial layer or disk of polyrafluoroethylene is sliced off to form a seal element having one surface with machined slits therein and at the same time facing off the end of the billet. The end face of the billet is then similarly slit and a new layer is cut off. This operation is repeated until the billet is consumed. Each washer is assembled into a case to form a finished oil seal as taught in my aforementioned patent application.

DETAILED DESCRIPTION

A seal element 10 comprises a polytetrafluoroethylene washer having a plurality of arcuate slits 12 cut into one face thereof. The slits 12 are oriented at an angle to the central axis of the seal element 10 and intersect one another to define a plurality of circumferentially spaced triangular pads 14. When the seal element 10 is assembled into a case (not shown) and disposed about a shaft (not shown) the pads 14 are deflected axially approximately ninety degrees into contact with the shaft whereupon the slits 12 in the seal element 10 open up slightly to form pumping grooves that function to pump oil back to the oil side thereof. Reference should be made to applicant's copending application Ser. No. 322,640 filed Nov. 18, 1981, now abandoned for a more complete discussion of the configuration and function of the slits 12 in the seal element 10.

Figure 2:
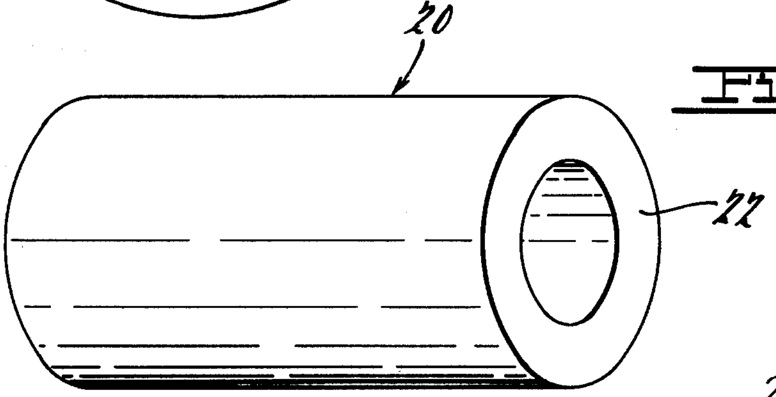
FIG. 2 is a perspective view of a billet of polytetrafluoroethylene.

The present invention is directed to a novel method for making the seal element 10. FIG. 2 illustrates a billet 20 of polytetrafluoroethylene having a flat end face 22. The end face 22 is initially machined to insure that it lies in a plane perpendicular to the central axis of the billet 20.

Figure 3:
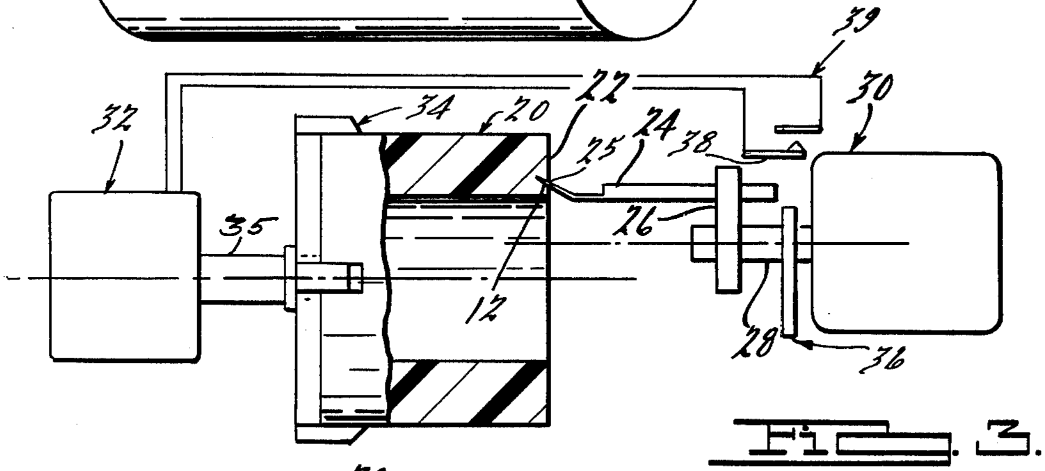
FIG. 3 is a diagramatic elevation of a motor driven slitting tool shown in cutting position relative to a billet that is mounted in a chuck for rotation by an indexing motor.
Figure 4:
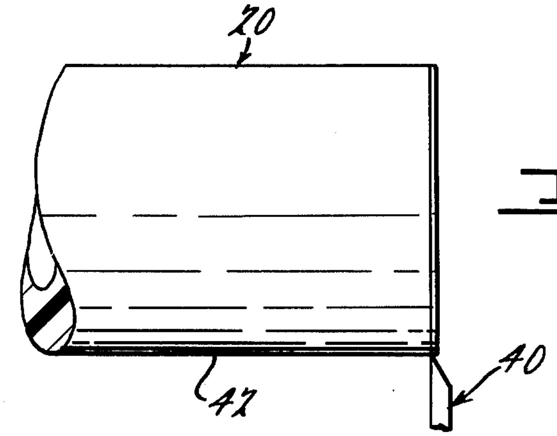
FIG. 4 is a slicing tool shown in operative relation to the billet.

As best seen in FIG. 3, a slitting tool 24 having an angularly related cutting edge 25 is mounted in a holder 26 which in turn is mounted on a shaft 28 of a gearmotor 30. The axis of rotation of the shaft 28 is radially displaced from the central axis of the billet 20 and the diameter of the circle traced by the cutting edge 25 of the tool 24 is less than the internal diameter of the billet 20.

After advancement of the tool 24 into the open center of the billet 20, as by a conventional feed mechanism mounting the gearmotor 30, rotation of the shaft 28 results in the tool 24 cutting the arcuate slit 12 in the end face 22 of the billet 20.

After the first slit 12 is cut in the end face 22 of the billet 20, the billet 20 is rotated about its central axis to a second position by an indexing motor 32. A suitable chuck 34 is mounted on an output shaft 35 of the gearmotor 32 for supporting the billet 20.

Figure 1:
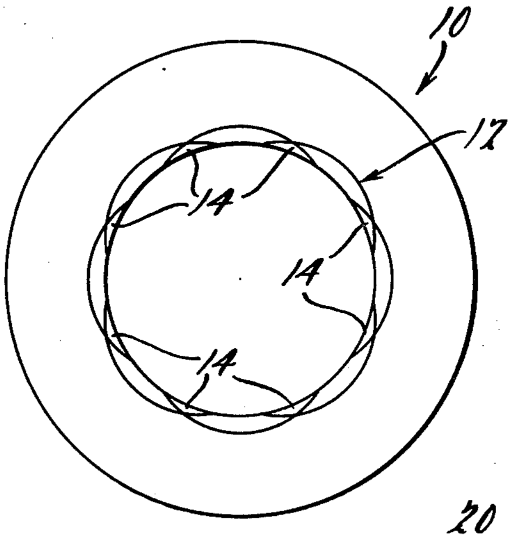
FIG. 1 illustrates a finished seal element.

To make the seal element of FIG. 1 of the drawings, the billet 20 is rotated or indexed in 45 degree increments about its central axis, the tool 24 cutting a slit 12 in the end face 22 at each of the indexed stations.

It is to be noted that, in accordance with one feature of the instant invention, the gearmotor 30 and tool 24 rotate continuously through eight revolutions, as controlled by a conventional electronic counter, not shown, when making the seal element 10 shown in FIG. 1. Each revolution of the shaft 28 brings a cam 36 thereon into engagement with a movable contact 38 of a switch 39. Closure of the switch 39 completes an electrical circuit that energizes the indexing motor 32 for rotation through a desired arc, in this case forty-five degrees. Thus, in accordance with a feature of the instant invention, rotation of the tool 24 and indexing of the billet 20 is continuous and fully synchronized whereby when the tool 24 is traveling through an arc interiorly of the billet 20, indexing thereof is accomplished. Moreover, after eight revolutions of the tool 24, it is stopped within the center of the billet 20 and advanced relative thereto by said conventional feed mechanism, not shown. In this manner, the end face 22 is provided with eight slits 12 resulting in the configuration shown in FIG. 1 of the drawings.

After the end face 22 is indexed through 360 degrees, a cutoff tool 40 is advance against an outer cylindrical surface 42 of the billet 20 to cut off a relatively thin slice or wafer of polytetrafluoroethylene thereby to complete the seal element 10. The aforesaid operation is repeated until the entire billet 20 is consumed.

While the preferred embodiment of the invention has been disclosed, it should be appreciated that the invention is susceptible of modification within the scope of the following claims.

I claim:

1. A method of making a hydrodynamic seal element from a billet of material having coaxial radially inner and outer cylindrical surfaces comprising the steps of facing off one end of said cylindrical billet to define and end face lying in a plane perpendicular to the central axis of the billet, indexing said billet about the central axis thereof to a first position, advancing a rotatable slitting tool having a cutting edge extending at an angle relative to the central axis of said billet and to the axis of rotation of said tool axially relative to said billet, rotating said slitting tool about an axis spaced from the central axis of said billet to cut a first arcuate slit in the end face thereof, indexing said billet about the central axis thereof to a second position, rotating said cutting tool about the axis of rotation thereof to cut a second arcuate slit in said end face, and advancing a slicing tool radially against said billet to slice off a relatively thin layer thereof.

2. A method in accordance with claim 1 wherein the radius of said arcuate slits is less than the radius of the radially inner surface of said billet.

3. A method in accordance with claim 2 wherein said arcuate slits overlap to define a triangle in conjunction with the radially inner surface of said billet.

4. A method in accordance with claim 1 wherein each of said arcuate slits intersects the inner cylindrical surface of said billet at two circumferentially spaced points.

5. A method in accordance with claim 1 wherein said slitting is advanced axially of said billet when said tool is interiorly thereof.

6. A method in accordance with claim 1 wherein said billet is indexed when said cutting tool is disposed interiorly thereof.

* * * * *